United States Patent
Larsen et al.

(10) Patent No.: US 11,144,620 B2
(45) Date of Patent: Oct. 12, 2021

(54) SYSTEMS AND METHODS FOR ESTABLISHING CONNECTIONS IN A NETWORK FOLLOWING SECURE VERIFICATION OF INTERESTED PARTIES

(71) Applicant: Counseling and Development, Inc., Roswell, GA (US)

(72) Inventors: Soudabeh Larsen, Roswell, GA (US); Jill Polisner, Roswell, GA (US)

(73) Assignee: Counseling and Development, Inc., Roswell, GA (US)

( * ) Notice: Subject to any disclaimer, the term of this patent is extended or adjusted under 35 U.S.C. 154(b) by 267 days.

(21) Appl. No.: 16/452,958

(22) Filed: Jun. 26, 2019

(65) Prior Publication Data

US 2019/0392123 A1 Dec. 26, 2019

Related U.S. Application Data

(60) Provisional application No. 62/690,031, filed on Jun. 26, 2018.

(51) Int. Cl.
*G06F 21/31* (2013.01)
(52) U.S. Cl.
CPC .................................. *G06F 21/31* (2013.01)
(58) Field of Classification Search
CPC ................................. G06F 21/31; G06F 21/45
See application file for complete search history.

(56) References Cited

U.S. PATENT DOCUMENTS

| | | | |
|---|---|---|---|
| 7,828,208 B2* | 11/2010 | Gangi | G06Q 20/204 235/380 |
| 9,424,419 B1* | 8/2016 | Kruse | G06F 21/31 |
| 9,954,844 B2* | 4/2018 | Pal | G06F 21/6218 |
| 9,965,543 B1* | 5/2018 | Ross | G06F 16/148 |
| 10,110,385 B1* | 10/2018 | Rush | H04L 9/3297 |
| 10,547,599 B1* | 1/2020 | Mehta | H04L 63/0892 |
| 10,931,662 B1* | 2/2021 | Church | H04L 67/10 |
| 2006/0185007 A1* | 8/2006 | Hourselt | H04L 63/0428 726/10 |
| 2007/0293202 A1* | 12/2007 | Moshir | G06F 21/57 455/414.2 |
| 2008/0081601 A1* | 4/2008 | Moshir | H04L 67/02 455/418 |
| 2009/0265552 A1* | 10/2009 | Moshir | H04W 4/12 713/168 |
| 2010/0132019 A1* | 5/2010 | Hardt | H04L 63/102 726/6 |
| 2011/0029778 A1* | 2/2011 | Garcia Morchon | H04W 12/043 713/171 |
| 2011/0099202 A1* | 4/2011 | Dedeoglu | G06F 21/6254 707/780 |
| 2013/0318199 A1* | 11/2013 | Le Jouan | G06Q 30/02 709/217 |

(Continued)

*Primary Examiner* — Aravind K Moorthy
(74) *Attorney, Agent, or Firm* — Finnegan, Henderson, Farabow, Garrett & Dunner, LLP

(57) ABSTRACT

Systems and methods are provided for establishing personal connections in a network following secure verification of interested parties. The disclosed embodiments may involve a system comprising a memory and a processor. The disclosed embodiments may require unique sets of identification parameters of each user in order to ensure a user has been properly verified prior to use of the system.

20 Claims, 7 Drawing Sheets

(56) References Cited

U.S. PATENT DOCUMENTS

| | | | | |
|---|---|---|---|---|
| 2014/0229733 | A1* | 8/2014 | Henze | H04L 63/102 |
| | | | | 713/168 |
| 2015/0143498 | A1* | 5/2015 | Pal | H04L 63/08 |
| | | | | 726/7 |
| 2015/0172272 | A1* | 6/2015 | Levner | G06F 21/45 |
| | | | | 726/7 |
| 2016/0078203 | A1* | 3/2016 | Moloian | G06F 21/31 |
| | | | | 726/17 |
| 2016/0242032 | A1* | 8/2016 | De Kievit | H04L 9/088 |
| 2017/0177901 | A1* | 6/2017 | Lancaster | G06F 21/6245 |
| 2017/0201550 | A1* | 7/2017 | Benson | G06F 21/41 |
| 2017/0279795 | A1* | 9/2017 | Redberg | H04L 63/0861 |
| 2017/0289169 | A1* | 10/2017 | Plichta | H04L 63/308 |
| 2018/0048472 | A1* | 2/2018 | Pirrwitz | H04L 63/0815 |
| 2018/0121636 | A1* | 5/2018 | Schiffman | G06F 21/34 |
| 2018/0343310 | A1* | 11/2018 | Mishra | H04L 63/08 |
| 2019/0007387 | A1* | 1/2019 | Jin | H04L 9/3226 |
| 2019/0007428 | A1* | 1/2019 | Moen | H04L 67/02 |
| 2019/0034621 | A1* | 1/2019 | Mondello | H04L 63/18 |
| 2019/0036700 | A1* | 1/2019 | Sundaresan | H04L 9/30 |
| 2019/0080063 | A1* | 3/2019 | Rice | G06F 21/6245 |
| 2019/0097794 | A1* | 3/2019 | Nix | H04L 9/0662 |
| 2019/0130479 | A1* | 5/2019 | Sweeney | G06Q 20/40 |
| 2019/0149320 | A1* | 5/2019 | Keselman | H04L 9/0861 |
| | | | | 380/279 |
| 2019/0180049 | A1* | 6/2019 | LeCour | G06F 16/90344 |
| 2019/0199528 | A1* | 6/2019 | Presman | H04L 9/0894 |
| 2019/0370456 | A1* | 12/2019 | Abbasian | G06F 21/41 |
| 2019/0372956 | A1* | 12/2019 | Breu | H04L 9/3239 |
| 2020/0027091 | A1* | 1/2020 | Hassani | G06Q 20/3821 |
| 2020/0034476 | A1* | 1/2020 | Grant | G06F 16/285 |
| 2020/0059461 | A1* | 2/2020 | Varanasi | H04L 63/105 |
| 2020/0065473 | A1* | 2/2020 | Berdy | H04W 12/069 |
| 2020/0067916 | A1* | 2/2020 | Spates, IV | G06F 21/31 |
| 2020/0076806 | A1* | 3/2020 | Nassar | H04L 63/102 |
| 2020/0092296 | A1* | 3/2020 | Brinckman | H04L 63/0815 |
| 2020/0311299 | A1* | 10/2020 | Amar | H04L 9/3213 |

* cited by examiner

SYSTEMS AND METHODS FOR ESTABLISHING CONNECTIONS IN A NETWORK FOLLOWING SECURE VERIFICATION OF INTERESTED PARTIES

PRIORITY CLAIM

This application claims priority from U.S. Provisional Application No. 62/690,031 filed Jun. 26, 2018, which is hereby incorporated by reference in its entirety.

TECHNICAL FIELD

The present disclosure generally relates to systems and methods for establishing personal connections in a network following secure verification of interested parties. More particularly, and without limitation, the disclosed embodiments relate to systems and methods for directing user interaction and notice of interested parties in establishing or reestablishing personal and professional connections via portal user interface. Generally, users are not assessing other previously unknown users for compatibility and interest.

BACKGROUND

The decision to formally reach out to another person, especially from one's past, in hopes of establishing or reestablishing a relationship, can be a difficult decision generally and also for many users of social media. Traditional platforms, such as social media platforms, geared towards finding a new relationship can result in otherwise desired connections or unappreciated ones. The reluctance to establish a new relationship or reestablish a past relationship through a network or other means (e.g. whether through direct or indirect, physical or electronic communication) may be less likely to occur or not occur at all due to fear of rejection, or current existing relationships that would preclude otherwise establishing a new relationship or reestablishing a former relationship. Ensuring users can demonstrate interest in establishing a connection with another verified user without any chance of that desire being discovered may free users to demonstrate those interests without fear of repercussions.

Previous applications have been designed in an attempt to create future or new relationships based on existing contacts from the user's contacts in social media on the user's smart device. In some instances, fake or misleading accounts may be created in these implementations. Some previous applications attempt to create anonymity by stating that people using their platform (e.g. dating websites or applications) are totally anonymous and/or random, and users do not know each other.

The systems, methods, and devices discussed herein solve the above-mentioned problems by offering systems, methods, and computer implemented media that provide a secure and anonymous mechanisms for brokering relationships between interested users.

SUMMARY

A system for establishing personal connections through secure verification of users consistent with embodiments of the present disclosure is provided. The system may include one or more memory devices storing instructions and one or more processors configured to execute the instructions to perform operations. The operations may include authenticating a first user associated with a first set of identification parameters, authenticating a second user associated with a second set of identification parameters, receiving input from the first user comprising a subset of the second set of identification parameters, receiving input from the second user comprising a subset of the first set of identification parameters, comparing the received input from the first and second users, and determining a match based on the comparison of said inputs; wherein if the compared inputs meet a defined threshold determining that a match has been made: notifying the first user of the subset of the second set of identification parameters, and notifying the second user of the subset of the first set of identification parameters.

In some embodiments, the threshold is set based on parameters of previous involvement, the parameters of previous involvement may include a duration of previous involvement, a level of seriousness of previous involvement, and reasons for termination of previous involvement. In some embodiments, the threshold includes a preset number of the identification parameters based on user preferences. The number of the identification parameters required may increase with the level of seriousness of previous involvement.

The first set of identification parameters may include secure personal information, the secure personal information may include social security number, city of birth, employment information, multi-factor authentication credentials, date of birth, nicknames, anniversaries, and maiden names. The second set of identification parameters may include secure personal information, the secure personal information comprising social security number, city of birth, employment information, multi-factor authentication credentials date of birth, nicknames, anniversaries, and maiden names.

In some embodiments, the subset of the first set of identification parameters includes relationship-specific criteria, the relationship-specific criteria comprising date of birth, nicknames, anniversaries, and maiden names, and the subset of the second set of identification parameters includes relationship-specific criteria, the relationship-specific criteria comprising date of birth, nicknames, anniversaries, and maiden names. The relationship-specific criteria may facilitate the first user and the second user to match based on the comparison of the inputs.

In some embodiments, authenticating the first user further includes authenticating the identity of the first user via a blockchain network, and authenticating the second user further includes authenticating the identity of the second user via a blockchain network. In some embodiments, notifying the first user and the second user occurs when a match has been made from both the first user and the second user. In some embodiments, notifying the first and second user is completed at a later time to preserve knowledge of which user first demonstrated interest.

A computer implemented method for establishing personal connections through blinded secure verification of non-random interested, consistent with embodiments of the present disclosure is provided. The method may include, authenticating a first user associated with a first set of identification parameters, authenticating a second user associated with a second set of identification parameters, receiving input from the first user comprising a subset of the second set of identification parameters, receiving input from the second user comprising a subset of the first set of identification parameters, comparing the received input from the first and second users, and determining a match based on the comparison of said inputs; wherein if the compared inputs meet a defined threshold determining that a match has been made: notifying the first user of the subset of the second set of identification parameters, and notifying the second user of the subset of the first set of identification parameters.

A non-transitory computer readable medium storing instructions, consistent with embodiments of the present disclosure is provided. The instructions, when executed, cause at least one processor to perform operations including authenticating a first user associated with a first set of identification parameters, authenticating a second user associated with a second set of identification parameters, receiving input from the first user comprising a subset of the second set of identification parameters, receiving input from the second user comprising a subset of the first set of identification parameters, comparing the received input from the first and second users; and determining a match based on the comparison of said inputs; wherein if the compared inputs meet a defined threshold determining that a match has been made: notifying the first user of the subset of the second set of identification parameters, and notifying the second user of the subset of the first set of identification parameters.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Systems and methods for establishing personal connections following secure verification of interested parties are disclosed. The disclosed embodiments may involve a system for establishing personal connections through secure verification of interested parties, comprising one or more memory devices storing instructions, and one or more processors configured to execute the instructions to perform operations. The disclosed embodiments further comprise a system for authenticating a first user associated with a first set of identification parameters and authenticating a second user associated with a second set of identification parameters. The disclosed embodiments may receive input from the first user comprising a subset of the second set of identification parameters and may receive input from the second user comprising a subset of the first set of identification parameters. The disclosed embodiments may compare the received input from the first and second users and determine a match based on the comparison of said inputs, wherein if the compared match is above a threshold and only upon determination of a match, the disclosed embodiments may notify the first user of the subset of the second set of identification parameters and may notify the second user of the subset of the first set of identification parameters.

Figure 1A:
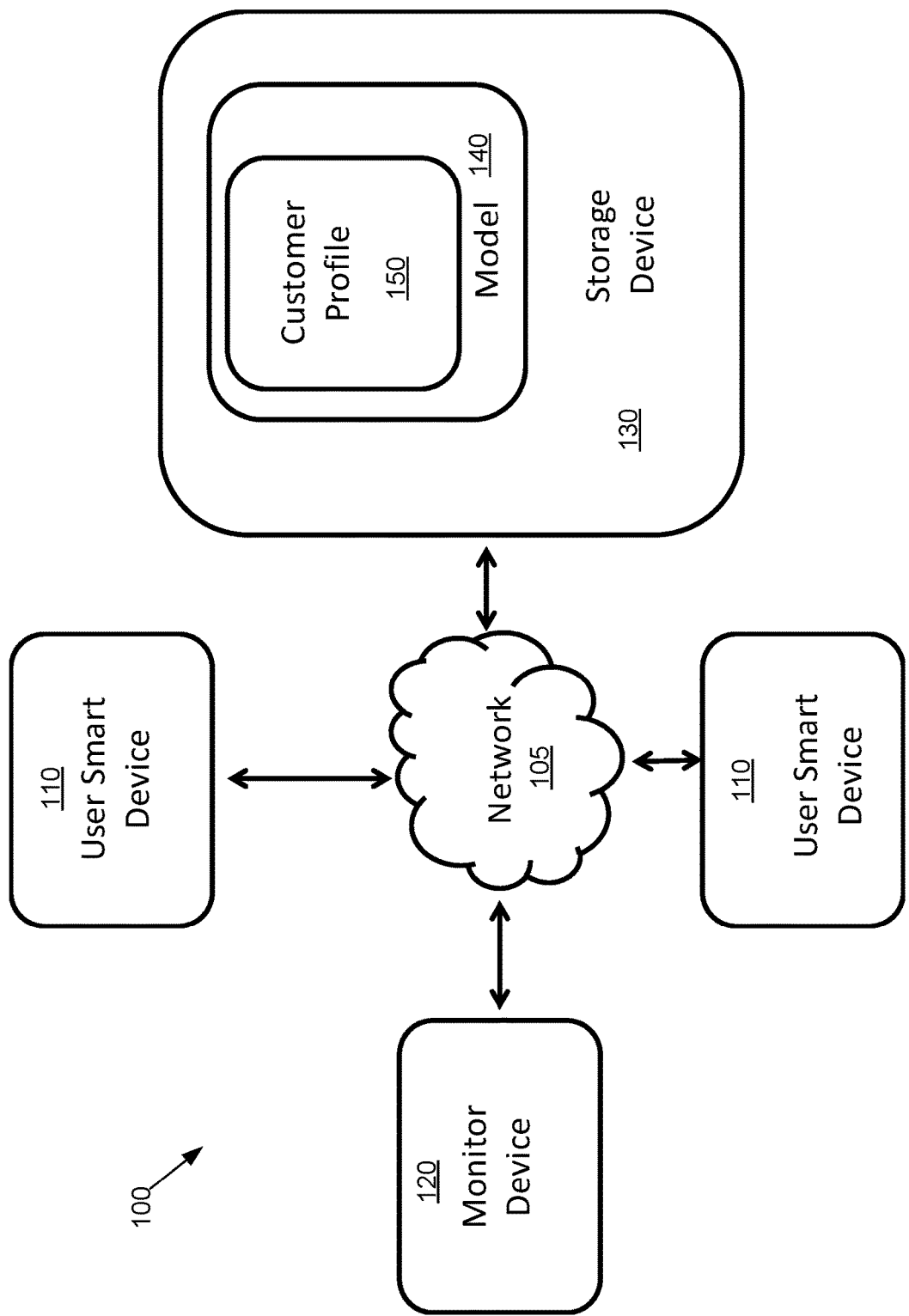
FIG. 1A depicts an example system environment for implementing embodiments consistent with the disclosed embodiments.

FIG. 1A illustrates an exemplary system 100 consistent with the present disclosure. System 100 may include a network 105 that connects one or more user smart devices 110, a monitor device 120, and a storage device 130. Storage device 130 may include a model 140 having a customer profile 150.

Figure 1B:
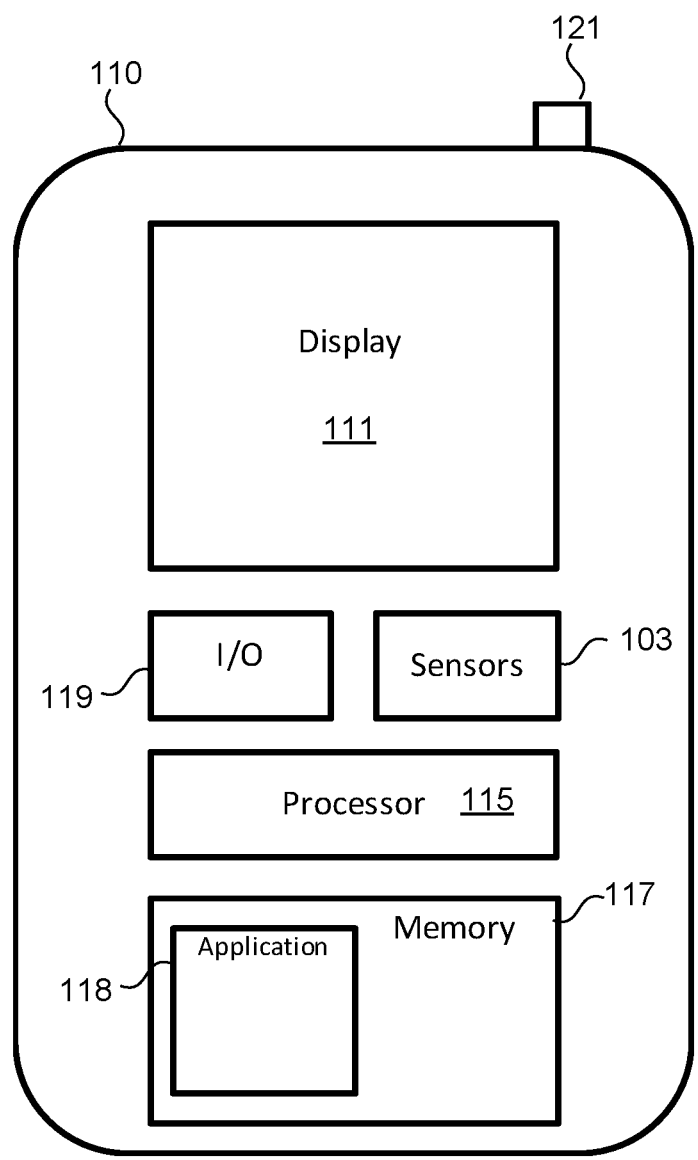
FIG. 1B depicts an example smart device for implementing embodiments consistent with the disclosed embodiments.

FIG. 1B depicts an exemplary user smart device 110 for use in establishing personal connections following secure verification of interested parties. As depicted in FIG. 1B, device 110 may comprise a smartphone. Device 110 includes a display 111. For example, display 111 may display one or more GUIs that allow a user to enter input authorizing and establish personal connections following secure verification of interested parties. In certain aspects, display 111 may comprise a touchscreen to facilitate use of the one or more GUIs.

Device 110 includes at least one processor 115. For example, processor 115 may comprise a system-on-a-chip (SOC) adapted for use in a portable device, such as device 110. Alternatively, or concurrently, processor 115 may comprise any other type(s) of processor. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or concurrently, the at least one processor may comprise one or more special-purpose devices built consistent with embodiments of the present disclosure using suitable circuit elements, e.g., one or more application-specific integrated circuits (ASICs), field-programmable gate arrays (FPGAs), or the like.

Device 110 includes one or more memories, e.g., memory 117. In certain aspects, memory 117, may comprise a volatile memory. In such aspects, memory 117, for example, may store one or more applications 118 (or "apps") for execution on processor 115. For example, an app may include an operating system for device 110 and/or an app for executing method 400 of FIG. 4. In addition, memory 117 may store data generated by, associated with, or otherwise unrelated to an app in memory 117.

Alternatively, or concurrently, memory 117, may comprise a non-volatile memory. In such aspects, memory 117, for example, may store one or more applications 118 (or "apps") for execution on at least one processor 115. For example, as discussed above, an app may include an operating system for device 110 and/or an app for establishing personal connections following secure verification of interested parties as described herein. In addition, memory 117 may store data generated by, associated with, or otherwise unrelated to an app in memory 117. Furthermore, memory 117 may include a page file, swap partition, or other allocation of storage to allow for the use of memory 117 as a substitute for a volatile memory if, for example, memory 117 is full or nearing capacity.

Device 110 includes at least one input/output module 119. Input/output 119 may include, for example, a pointing device, keyboard, buttons, switches, microphones, and/or a touchscreen panel. I/O devices 119 may also include one or more communication modules (not shown) for sending and receiving information from other components in system 100 by, for example, establishing wired or wireless connectivity (via antenna 121) between user smart device 110 to network 105, or by establishing direct wired or wireless connections between user smart device 110 and other components of system 100. Direct connections may include, for example, Bluetooth™, Bluetooth LE™, WiFi, near field communications (NFC), or other known communication methods which provide a medium for transmitting data between separate devices. Input/output module 119 may store and retrieve data from one or more databases. For example, database(s) may include records associated with one or more users, e.g. accounts associated with interested parties as described herein. Device 110 may include one or more sensors 103. Non-limiting examples of sensors include, but are not limited to, microphones, cameras, touch sensors, and the like.

The disclosed embodiments may create opportunities for love and spiritual connections, including rekindling previous relationships, taking current relationships to the next level, or relationships that were strong in the past but have since ended or distanced themselves (i.e. "old flames"), by providing system 100, including network 105, user smart device 110, monitor device 120, and storage device 130. System 100 may enables a person to pursue the kind of relationship that person desires without experiencing the associated risks and fears of rejection. The disclosed embodiments may offer opportunities for capturing desired relationships that oftentimes escape users because of an unwillingness or a fear wrought from vulnerability, particularly with respect to previous relationships. Ego and pride often stand in the way and keep users from taking the actions needed to establish or reestablish a prior relationship that a user would like to have. Accordingly, the user may utilize system 100, user smart device 110, and application 118 to initiate the process of establishing personal connections. In some embodiments, system 100 will allow users to interact with application 118 which may be used as unique identifier as compared to traditional social media platforms such that application 118 does not allow fake accounts and having strong authentication to ensure protection of its users.

Although depicted as a smart phone, device 110 may alternatively comprise a tablet or other computing device having similar components.

Figure 1C:
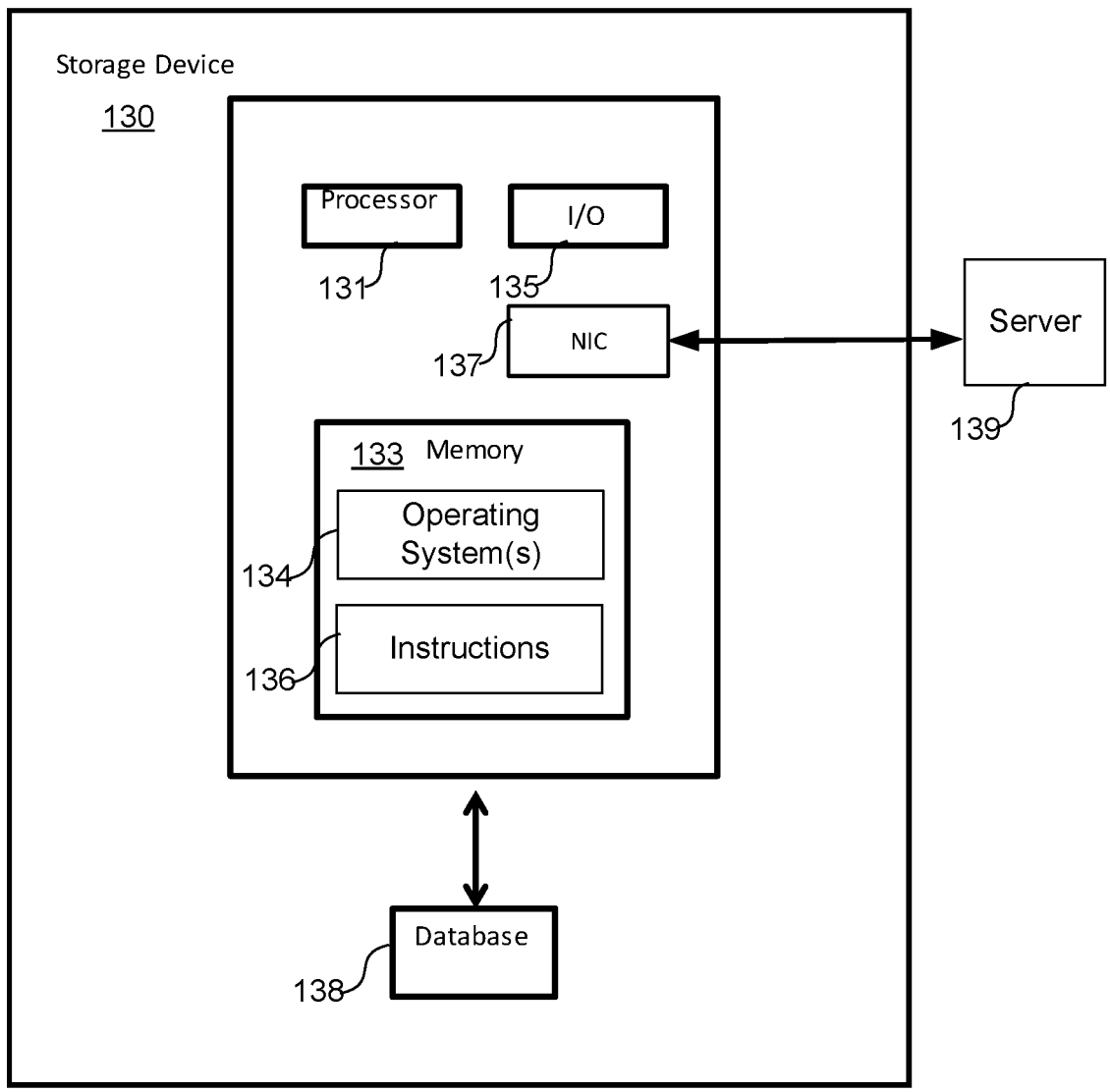
FIG. 1C depicts an example storage device for implementing embodiments consistent with the disclosed embodiments.

FIG. 1C illustrates a block diagram of an exemplary storage device 130 suitable for implementing the disclosed systems and methods. For example, device 130 may comprise a server that executes the steps of FIG. 4. In some embodiments, the server may include the system described in FIG. 3.

As depicted in FIG. 1C, device 130 includes a processor 131. Processor 131 may comprise a single processor or a plurality of processors. For example, processor 131 may comprise a CPU, a GPU, a reconfigurable array (e.g., an FPGA or other ASIC), or the like.

Processor 131 may be in operable connection with a memory 133, an input/output module 135, and a network interface controller (NIC) 137. Memory 133 may comprise a single memory or a plurality of memories. In addition, memory 133 may comprise volatile memory, non-volatile memory, or a combination thereof. Memory 133 may store one or more operating systems 134 and program instructions 136 for establishing personal connections following secure verification of interested parties. For example, the stored instructions may cause server 139 to execute the steps of method 400 of FIG. 4. In addition, memory 133 may store data produced by, associated with, or otherwise unrelated to operating system and/or instructions for establishing personal connections following secure verification of interested parties.

Input/output module 135 may store and retrieve data from one or more databases 138. For example, database(s) 138 may include records associated with one or more users, e.g. accounts associated with customers and non-customers of the credit service provider as described above, at least one of which is updated in accordance with execution of steps of method 400 of FIG. 4.

NIC 137 may connect server 139 to one or more computer networks. In the example of FIG. 1C, NIC 137 may connect server 139 to the Internet. Thus, the Internet may correspond to or be connected with network 105. Server 139 may transmit and receive data and instructions over a network using NIC 137.

Each of the above identified methods, instructions, and steps may correspond to a set of instructions for performing one or more functions described above. These instructions need not be implemented as separate software programs, procedures, or modules. Disclosed memories may include additional instructions or fewer instructions. Furthermore, server 139 may execute the steps of method 400 of FIG. 4. These functions of the server 139 may be implemented in hardware and/or in software, such as in one or more signal processing and/or application-specific integrated circuits. In some embodiments, device 130 may replace device 110 in FIG. 1A.

Figure 2:
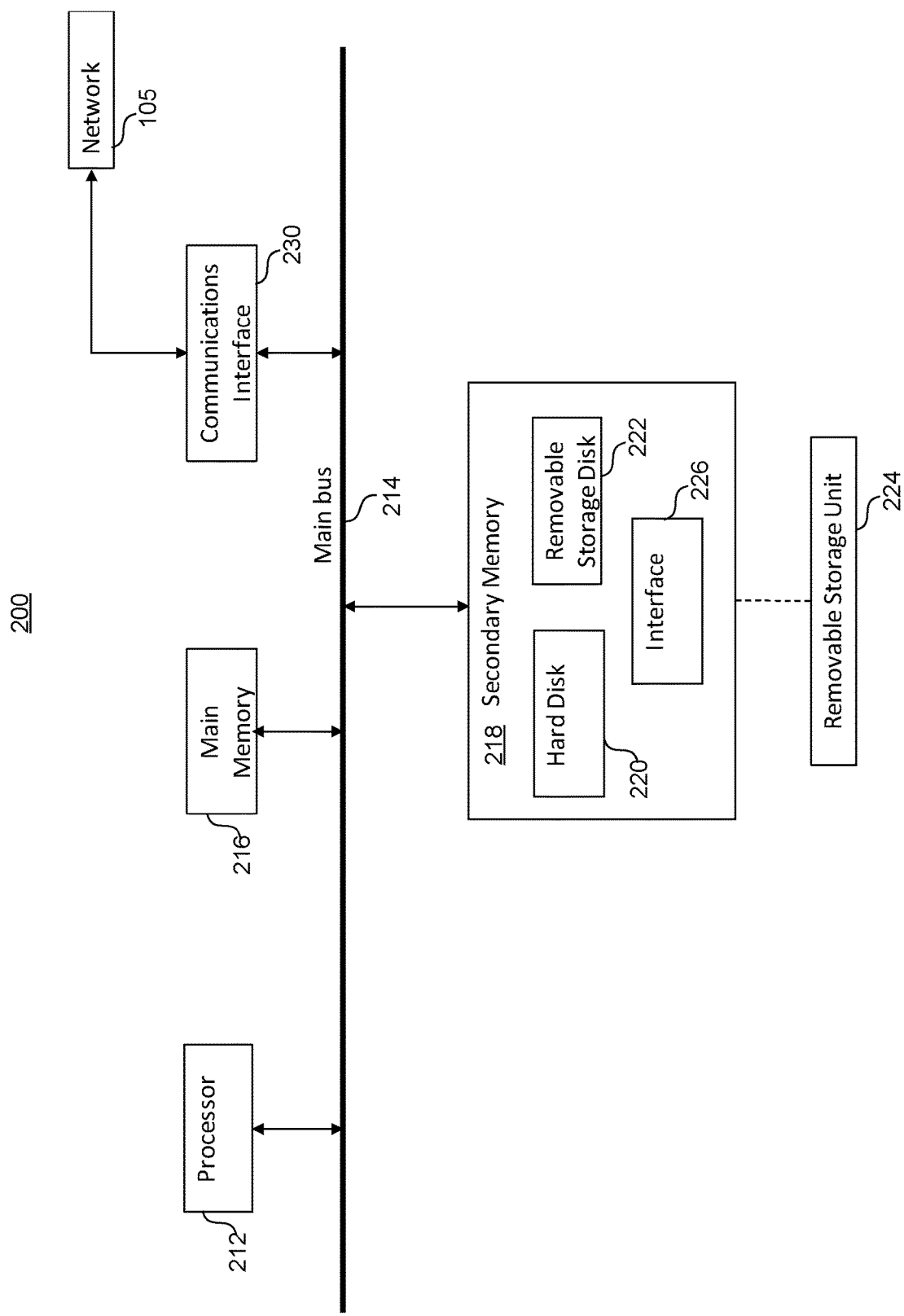
FIG. 2 depicts an example computing system for implementing processes consistent with the disclosed embodiments.

FIG. 2 illustrates an exemplary computer system 200, consistent with embodiments of the present disclosure. The exemplary computer system 200 of FIG. 2 may be used to implement the components of FIGS. 1A-1C, including user smart device 110, and device 130. In some embodiments, computer system 200 may be implemented as monitor device 120. For example, in some embodiments, monitor device 120 may monitor activity from user smart device(s) 110 and storage device 130.

As shown in FIG. 2, computer system 200 includes one or more processors, such as processor 212. Processor 212 is connected to a communications infrastructure 214, such as a bus or network (e.g., network 105 of FIGS. 1A and 1D).

Computer system 200 also includes a main memory 216, for example, a random-access memory (RAM), and may include a secondary memory 218. Secondary memory 218 may include, for example, a hard disk drive 220 and/or a removable storage drive 222, representing a magnetic tape drive, an optical disk drive, CD/DVD drive, etc. Removable storage drive 222 reads from and/or writes to a removable storage unit 224 in a well-known manner. Removable storage unit 224 represents a magnetic tape, optical disk, or other non-transitory computer-readable storage medium that is read by and written to by removable storage drive 222. As will be appreciated, the removable storage unit 224 can represent a non-transitory computer-readable medium having stored therein computer programs, sets of instructions, code, or data to be executed by processor 212.

In alternate embodiments, secondary memory 218 may include other means for allowing computer programs or sets of instructions to be loaded into computer system 200. Such means may include, for example, a removable storage unit 224 and an interface 226. An example of such means may include a removable memory chip (e.g., EPROM, RAM, ROM, DRAM, EEPROM, flash memory devices, or other volatile or nonvolatile memory devices) and an associated socket, or other removable storage units 224 and interfaces 226, which allow instructions and data to be transferred from removable storage unit 224 to computer system 200.

Computer system 200 may also include one or more communications interfaces, such as communications interface 230. Communications interface 230 allows computer software, instructions, and/or data to be transferred between computer system 200 and external devices. Examples of communications interface 230 may include a modem, a network interface (e.g., an Ethernet card), a communications port, a PCMCIA slot and card, a wireless transmitter or card, etc. Computer software, instructions, and/or data may be transferred via communications interface 230 in the form of signals (not shown), which may be electronic, electromagnetic, optical, or other signals capable of being received by communications interface 230. These signals are provided to communications interface 230 via a communications path (i.e., channel). Channel carries signals and may be implemented using wire or cable, fiber optics, an RF link, wireless transmissions, and other communications channels. In another embodiment, signals comprise data packets sent to processor 212. Information representing processed packets can also be sent in the form of signals from processor 212 through channel.

The terms "storage device" and "storage medium" may refer to particular devices including, but not limited to, main memory 216, secondary memory 218, a hard disk installed in hard disk drive 220, and removable storage unit 224. Further, the term "non-transitory computer-readable medium" may refer to devices including, but not limited to, a hard disk installed in hard disk drive 220, any combination of main memory 216 and secondary memory 218, and removable storage unit 224, which respectively provide computer programs and/or sets of instructions to processor 212 of computer system 200. Such computer programs and sets of instructions can be stored within one or more non-transitory computer-readable media. Additionally, or alternatively, computer programs and sets of instructions may also be received via communications interface 230 and stored on the one or more computer-readable media.

Such computer programs and instructions, when executed by processor 212, enable processor 212 to perform one or more of the computer-implemented methods described herein. Examples of program instructions include, for example, machine code, such as code produced by a compiler, and files containing a high-level code that can be executed by processor 212 using an interpreter.

The computer-implemented methods described herein can also be implemented on a single processor of a computer system, such as processor 212 of system 200. In another embodiment, computer-implemented methods consistent with embodiments of the present disclosure may be implemented using one or more processors within a single computer system, and additionally or alternatively, these computer-implemented methods may be implemented on one or more processors within separate computer systems linked via a network.

One embodiment may be utilized so that users are able to make desires known, while keeping emotions protected and identities confidential. The disclosed system (e.g. system 100 and method 400) may establish a connection between users once mutual interest in that connection is established.

Figure 3:
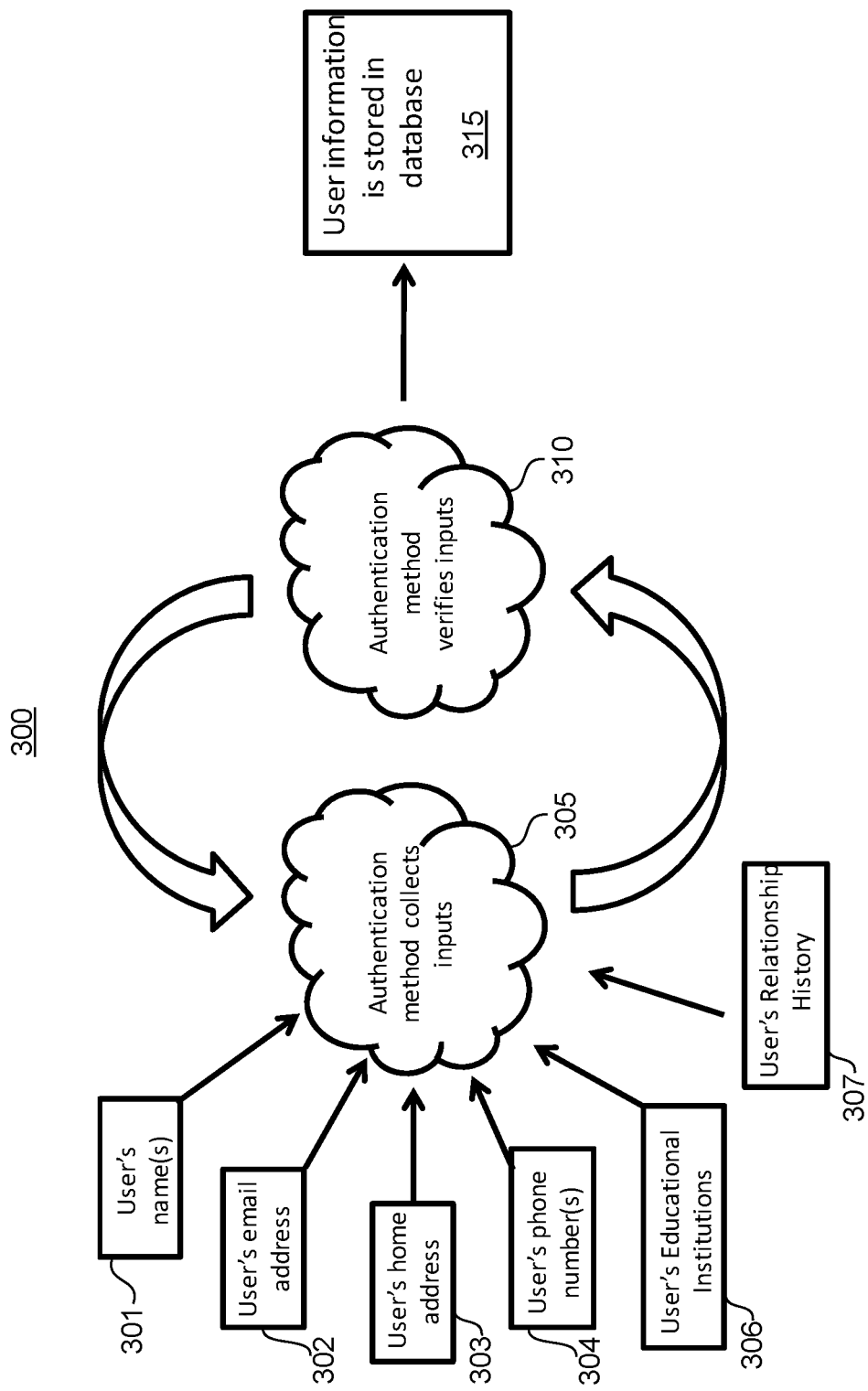
FIG. 3 depicts an example authentication system for implementing processes consistent with the disclosed embodiments.

FIG. 3 illustrates an exemplary authentication process 300 consistent with embodiments of this disclosure. Process 300 may include accumulating a plurality of identification parameters for one or more users. Non-limiting examples of identification parameters include the user's name 301, the user's email address 302, the user's home address 303, the user's phone number(s) 304, the user's educational institutions 306, and the user's relationship history 307. The user's name 301 may include a first, middle, and last name. In some embodiments, the user's name 301 may further include a maiden name, family name, or other given names. The user's email address 302 may include a primary email address, which may be an actively used email. The user's email address 302 may further include previous email addresses that the user may no longer use, but persons of interest from user's past may have and believe are still the user's email address. The user's home address 303 may include a current home address as well as addresses of previous residences. The user's phone number(s) 304 may include current mobile number, work number, and home number, as well as previous mobile numbers, work numbers, and home numbers. The user's educational institutions 306 may include grade school, middle school, high school, undergraduate university, graduate university, law school, medical school, trade school, among others. The user's relationship history 307 may include information about family members, previous significant others, a duration of previous involvement, a level of seriousness of previous involvement, reasons for termination of previous involvement.

In some embodiments, a system may be designed such that users of interest may be entered with some unique identification parameters such as, but not limited to, first and last name, phone number, and birthdate or similar, to avoid false matches based on similar identification parameters in other users.

In certain embodiments, a system may be designed to allow multiple combinations of names and other unique identification parameters to be entered for the same user of interest, in the event a user may know the user of interest by different unique identification parameters than the user currently identifies with.

At step 305, the user may login (e.g. at step 305) with their credentials that he/she has received by authenticating themselves and when entering the identifiers for their person of interest they may use one or more identifiers like user's name 301, user's date of birth, social security number ("SSN"), user's email address 302, user's home address 303, user's phone number(s) 304, user's educational institutions 306, and user's relationship history 307, etc. depending on the levels of involvement, engagement, or significance (higher or lower threshold as described below) they have had with this person. The user should also enter what this person of interest might search for by to find them. This could be things like maiden name of the user because their person of interest may know the user only by maiden name or a nick name or phrase they have been using with each other. (Like President Bush's wife will call him Bushy). The system will keep this information and search for the other person and if there is no match, it will keep this record until the expiration date or possible deletion. If the person of the interest enters this user's info at a later time the system will search the database and find a potential match unless it has expired or deleted.

In some embodiments, two users of system 100 may be two people that had a particular past together that can be measured by levels of significance, as in a long-term relationship or blood relatives. In other embodiments, two users of system 100 may include two people that know each other as in class mates or friends that want to enter into a relationship and bring it to the next level.

When two users have been in a relationship, familial, plutonic or romantic, for example, and have been estranged for months, or even years, fear may stop them from reaching out and rekindling the relationship. The system (e.g. system 100) may reconnect identified others in a safe and non-threatening way.

In some embodiments, the system 100 may define relationship with levels or thresholds which will be based on several parameters. The threshold may be set based on parameters of previous involvement, the parameters of previous involvement comprising a duration of previous involvement, a level of seriousness of previous involvement, and reasons for termination of previous involvement. The threshold may include a preset number of the identification parameters based on user preferences.

For example, a higher level or threshold is achieved based on a longer past relationship or the level of connection such as family members, they will have a higher level than the relationships that has less parameters. The level may be defined as how many unique identification parameters are entered to achieve a higher level. For example, if two people had been married in the past, they would need to enter more identification parameters than two people who dated briefly or friends in a class together. Family members would also have more identification parameters than high school friends.

At step 310, the authentication method verifies inputs after collecting inputs at step 305 and repeats this cycle of collecting inputs and verifying inputs.

At step 315, the user information is stored in a database (e.g. memory 117, memory 133 discussed above). In some embodiments, the first set of identification parameters may include secure personal information, the secure personal information comprising social security number, city of birth, employment information, multi-factor authentication credentials, date of birth, nicknames, anniversaries, and maiden names, among others. Similarly, the second set of identification parameters may include secure personal information, the secure personal information comprising social security number, city of birth, employment information, multi-factor authentication credentials date of birth, nicknames, anniversaries, and maiden names. In some embodiments, the identity of the first and second users can be achieved using a blockchain network, as will be described in more detail below.

In certain embodiments, the system (e.g. system 100) may include a secure log-in process through a technology where a verification code is used, and users must use that code for every use of the technology.

In some embodiments, a system may include one login and password for security. Certain embodiments may include terms and conditions (subject to clipwrap, click-through, brousewrap or other manners of expressing assent) when creating an account to verify that the user is over the age of 18 or has parental consent and agrees to abide by usage rules, and that require the user to complete a defined set of identification parameters to confirm the user's identity.

Other credentials may also be added, such as, but not limited to, credit card or PayPal account information.

Figure 4:
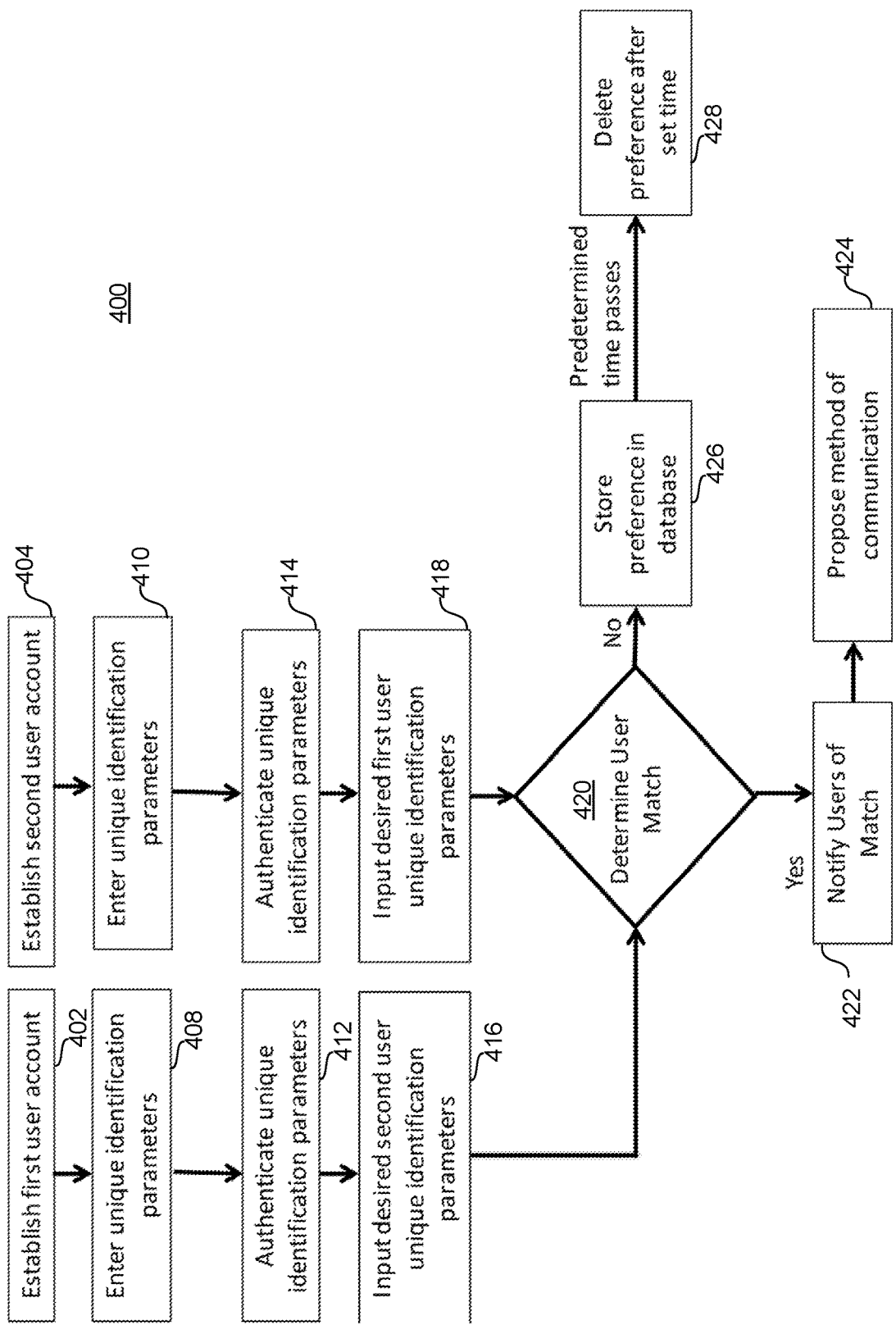
FIG. 4 depicts a flowchart for an example process for collecting user data that uniquely identifies and connects the user with separate uniquely identified users consistent with the disclosed embodiments.

FIG. 4 depicts a flowchart for an exemplary method 400 for collecting user data that uniquely identifies and connects the user with separate uniquely identified users consistent with the disclosed embodiments. Method 400 may include establishing a first user account 402 and establishing a second user account 404. The first user account 402 and second user account 404 may be created when the users enter a plurality of identification parameters. The first user account 402 and the second user account 404 may be stored, for example, on user smart device 110 and on storage device 130. Accordingly, customer profile 150 may refer to a first user account and/or a second user account that may be stored on storage device 130. The first user account 402 and the second user account 404 may store all user unique identifiers and preferences as described herein, and user's may access their respective accounts to view activity regarding matches made, communicating with matches made, and updating unique identifies to identify additional or new matches. As described above, the first user may enter unique identification parameters 408 and the second user may enter unique identification parameters 410. Non-limiting examples of identification parameters include the user's name 301, the user's email address 302, the user's home address 303, the user's phone number(s) 304, the user's educational institutions 306, and the user's relationship history 307.

The method 400 may further include authenticating the first user's unique identification parameters 412 and authenticating the second user's unique identification parameters 414. Once the first and second user's unique identification parameters have been authenticated at steps 412, 414, the first user may input desired second user unique identification parameters 416 and the second user may input desired first user unique identification parameters 418. Non-limiting examples of identification parameters include the user's name 301, the user's email address 302, the user's home address 303, the user's phone number(s) 304, the user's educational institutions 306, and the user's relationship history 307, as described above. In certain embodiments, the system (e.g. system 100 and method 400) may be designed to allow users to uniquely identify other users of interest. A first user identifies a known second user with whom the first user would like to establish a relationship using unique identification parameters at step 416. If the second user similarly demonstrates an interest in a relationship with the first user through similar unique identification parameters at step 418, some embodiments may determine a match between the first and second users 420 and may notify both users that the mutual interest exists 422.

The method 400 may further propose a method of communication to each user 424. In some embodiments, a system may be designed to ask how the user wants to be contacted when a match between users is made, including, but not limited to, by text message, email, or account inbox. When a match is found, both users will be notified by the communication method they selected at the time the mutual interest is established. In some embodiments, a notification may be sent at a later time to preserve knowledge of which user first demonstrated interest. If either user never identifies the other user for a potential connection using unique identification parameters, the initiating inquiry is never known, concealing the interested user's desire and avoiding any adverse emotional or psychological effects. The method 400 may store the preferences 426 entered by the first and second users in a database (e.g. memory 207, memory 303 discussed above), and the method 400 may repeat for any number of users.

In a non-limiting example, a first and second user follow the steps of method 400, but a match is not determined at step 420. The user's preferences may be stored at step 426 for a predetermined amount of time (e.g. days, weeks, months, or years) based on user preferences. A third, fourth, fifth, or any number of additional users may complete method 400, including entering inputting desired unique identification parameters of another user (e.g. steps 416, 418). The method 400 may determiner a match at step 420 between two of the plurality of users that have undergone method 400.

Additionally, the method 400 may delete preferences after a set time 428. In some embodiments, the system (e.g. system 100 and method 400) may allow for expiring dates for the demonstrated interest, ensuring the user may show interest in establishing a personal connection while not committing to demonstrating interest after that interest has passed. If an expiration date is not selected, a default expiration of some set length of time may be selected for each demonstrated interest. The disclosed embodiment may then eliminate notifications based on expired entries following expiration. By setting an expiration date, the system will stop searching for a match after a given time where a user may not be interested anymore. The person of interest may not be interested in re-connecting or restarting a relationship at the same time and therefore it is in the user's discretion to tell the system how long they want to wait to potentially hear back from that person. Additionally, a user may select to have it forever or for a very long time.

In certain embodiments, the system (e.g. system 100 and method 400) may be designed to provide the emotional safeguards and security so that risks can be taken while user privacy is protected. Having this level of protection will allow users the flexibility and freedom to be honest with their wishes and desires that they may otherwise keep hidden, causing them to miss many relationship opportunities. Some embodiments may provide second chances for broken relationships, estranged families, and the courage to follow-up on chance and other meetings.

"It's a lock" is a term used when something is a "for sure" thing. In reality, "for sure" exists rarely, if at all. However, in some embodiments, it is a "lock" when entering into that desired relationship, with that specific user, and not having to face anxiety or risk the embarrassment, even humiliation, of making wishes known if they are not reciprocated, a fear that may keep users from otherwise demonstrating interest in a connection. If the desired connection is not reciprocated by both users, the initiating inquiry is never notified to either user, concealing a user's interest in establishing a connection.

In some embodiments, the system (e.g. system 100 and method 400) may be used for past romantic relationships, for example, divorcees wanting to reunite or separated couples having a change of heart, where neither would initiate the re-connection. Additionally, the system (e.g. system 100 and method 400) may be used for relationships between estranged family members and former friends, in order to anonymously show an interest in reestablishing a relationship (after, for example, one individual comes to regret the loss of such relationship or no longer harbors hostility over the event that led to the relationship ending). Certain embodiments may be used by users interested in establishing a connection with a person in mind based on unique identification parameters.

In some embodiments, the system (e.g. system 100 and method 400) may be utilized by socially anxious users fearful of rejection from previous relationships with uniquely identified users from their past. Certain embodiments may be used by gay, lesbian, bisexual and transgender users who are not ready to reveal their sexual orientation or gender identity publicly but are also interested in pursuing their romantic interests with a specific person while keeping their privacy intact if their feelings are not reciprocated. Certain embodiments may eliminate the fear that may be associated with approaching people from different demographic, sociological, and cultural backgrounds. Some embodiments may be used by users of more advanced ages who are uncomfortable dating or contacting a known potential romantic interest.

In certain embodiments, the system (e.g. system 100 and method 400) may to provide users to express their interest in bringing the relationship to the next level, like saying "I love you" for the first time or propose or having kids etc., in an existing relationship.

In some embodiments, the system (e.g. system 100 and method 400) may be used for those in platonic friendships who may wish to change the friendship to a romantic relationship. Certain embodiments may be used by those recently deciding to pursue new relationships following a divorce or death of a spouse who are emotionally vulnerable. Certain embodiments may be used by younger users who seek a date for a specific event, such as for a dance or prom.

In some embodiments, the system (e.g. system 100 and method 400) may be used by fighting friends or family members who have not been in contact for reasons such as, but not limited to, financial, estate or trust issues, or myriad life events.

In certain embodiments, the system (e.g. system 100 and method 400) may be used by users interested in ending a relationship. Certain embodiments may allow apprehensive users to inform current relationship partners that the relationship is no longer desired while remaining interested in maintaining a friendly relationship.

In some embodiments, the system (e.g. system 100 and method 400) may allow users currently in a romantic relationship to pursue other relationships outside of the current relationship without sacrificing the current relationship.

In certain embodiments, the system (e.g. system 100 and method 400) may be used for other desired interactions, such as financial and contractual negotiations, settlement negotiations, and other instances where two users must agree on a specified set of terms without disclosing to the other user the extent of their willingness to negotiate and the terms they may otherwise agree to in said negotiations.

In some embodiments, the system (e.g. system 100 and method 400) may be used for reconnecting users who were previously in a relationship, such as a romantic relationship. In some embodiments, the user's may be interested in reconnecting for non-romantic reasons such as a working relationship, a business relationship, a friendship, or the like, without connecting the users with the impression that a romantic connection is being initiated.

In certain embodiments, the system (e.g. system 100 and method 400) may require users to verify they are not currently involved in a romantic relationship. If users are currently involved in a romantic relationship, certain embodiments may provide a questionnaire before proceeding, and, based on the answers to the questionnaire, direct such users to alternative recommended embodiments.

In certain embodiments, (e.g. system 100 and method 400) may provide an optional set of questions to determine the nature of the previous relationship and the circumstances under which the relationship ended.

In some embodiments, (e.g. system 100 and method 400) may allow the user to remove any demonstrated interest at any time if the user decides there is no longer a demonstrated interest in establishing a relationship with another user.

In certain embodiments, the system (e.g. system 100 and method 400) may include the use of blockchain technology to ensure secure establishment of personal connections.

Figure 5:
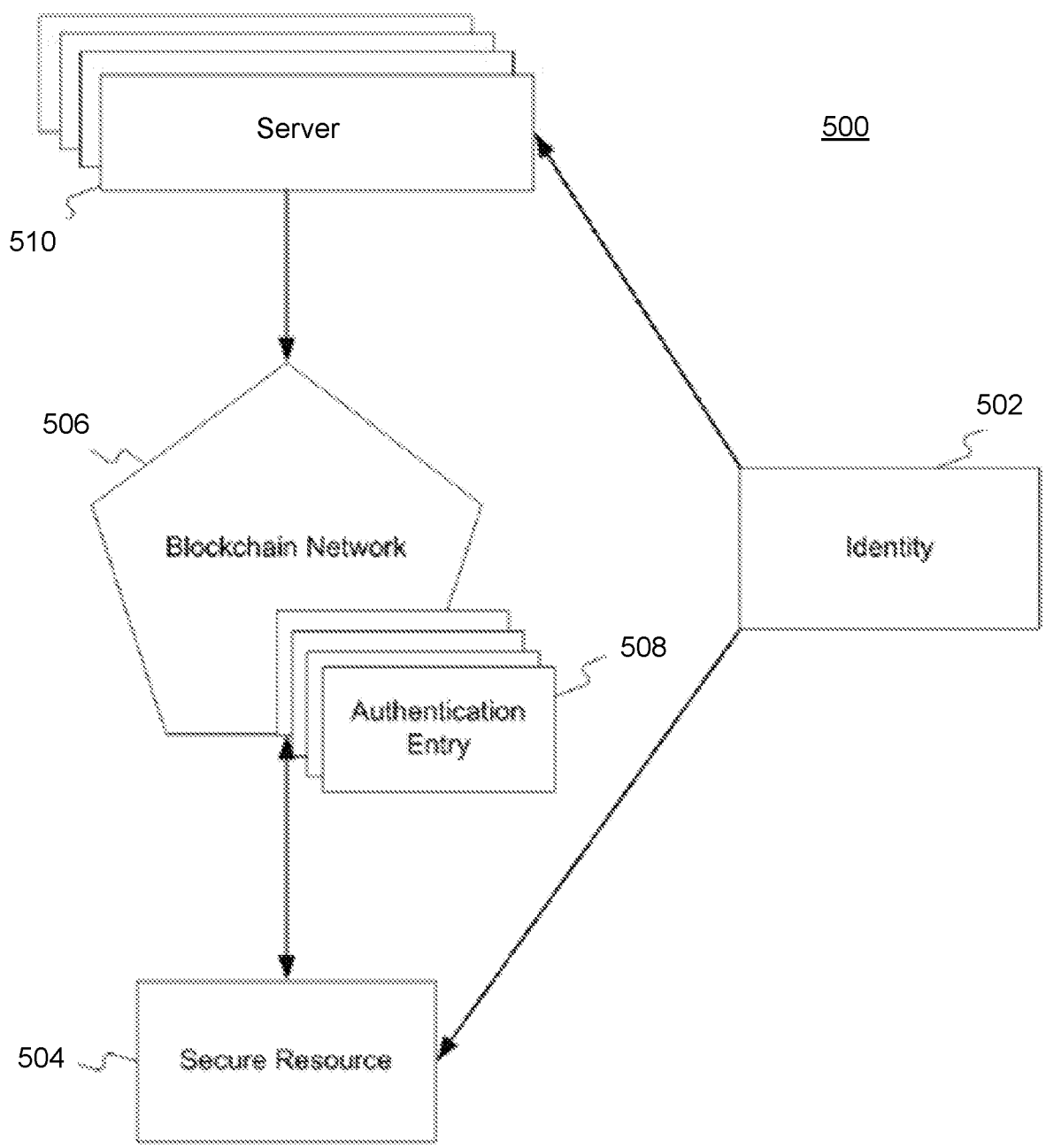
FIG. 5 illustrates an exemplary system for authentication consistent with the disclosed embodiments.

FIG. 5 is an exemplary system 500 for authenticating users. System 500 comprises a user identity 502, secure resource 504, blockchain network 506, authentication entry 508, and server 510. System 500 may be used for authenticating users as described in steps 305, 310, 412, 414 above.

As shown, system 500 includes an identity 502 and a secure resource 504, which may be accessible to identity 502 in an access-restricted manner.

Identity 502 may be any account, person, or entity attempting to access a resource, such as a database, server, storage device, another identity, etc. In other embodiments, identity 502 may be an automated and/or computerized entity. For example, a computerized entity may be a scheduled backup service, task, etc. performed by one or more processors or systems. System 500 may require these automated and/or computerized entities to be authenticated to the system prior to performing a task. In some embodiments identity 502 may be authorized to access the resource 504. In other embodiments, identity 502 may not be authorized to access the resource 504. Identity 502 may be, for example, a local account on a computer, a user account (e.g. established user accounts at steps 402, 404), or computer system that is established according to a particular operating system (e.g., Microsoft Windows®, Mac OS®, UNIX, etc.), a particular security service, or another service or protocol governing the computer or computer system. Identity 502 may also be a network account, such as an account established according to a network operating system (e.g., a Microsoft® network operating system, a Cisco® network operating system, a Dell® network operating system, a Linux network operating system, etc.). Further, network account identities may be established based on network security protocols or services. In addition, identity 502 may be an instance of a virtual machine or container running in a cloud computing environment. Identity 502 may also be a token used to identify a particular computing resource, person, account, virtual machine, container, or other entity accessing a computer or network. Identity 502 may be the identity of the first user, or the second user as described above, and may be verified as described herein.

Secure resource 504 may be any secure device, application, database, and/or network that requires an identity (e.g., identity 502) to be authenticated before accessing the resource. Secure resource 504 may be, for example, a database, a server, an IoT device, a personal computing device, a smartphone, a vehicle infotainment system, computer-embedded clothing, a building, an automated teller machine (ATM), a website, a mobile application, or various other types of network-accessible resources. In some embodiments, secure resource 504 may require authentication, such as through the use of a privileged credential (e.g., password, SSH key, symmetric (e.g., public/private) key, or other type of cryptographic data or privileged access token). In accordance with disclosed embodiments, however, such authentication information, if any, need not be provided by identity 502.

Blockchain network 506 is a distributed system providing for the storage of distributed ledgers across one or more entities. Blockchain network 506 may be an existing (public or private) distributed network formed from and stored by a plurality of computing devices. The network may be provided or managed by a service provider, such as BitSE™, Blocko™, Bloq™, Peer Ledger™, or others, or it may be an internal or proprietary blockchain network. Blockchain network 506 may maintain a continuously growing ledger hardened against tampering and revision and may be composed of data structure blocks that exclusively hold the data received from server 510 or other sources. In some embodiments, every computing device in blockchain network 506 has a copy of the ledger, thereby ensuring that each ledger is independently able to assist in performing authentication. In other embodiments, as discussed further below, only a subset of entities in blockchain network 506 may have a copy of the ledger.

The data structure of blockchain network 506 may store data on one or more identities 102 accessing the blockchain network 506. For example, a data structure may include historical interaction data, human access attributes, human/machine response to challenges, and/or requests. Additionally, as discussed below, blockchain network 506 may maintain data collected from sensors throughout an environment (e.g., IoT sensors). Historical interaction data may include:

approved requests (e.g., approved log-in requests, approved building access using an RFID tag, etc.)

rejected requests (e.g., failed log-in attempts, attempted building access using an unrecognized RFID tag, etc.)

access time frame (e.g., how many times the identity has accessed the environment in a predefined period of time)

accessed services, systems, and/or applications (e.g., what resources the identity accessed or attempted to access)

last user interaction (e.g., the last action the identity completed or attempted in the environment)

last access time (e.g., the most recent time the identity was authenticated or attempted to authenticate)

Human access attributes may include, for example:

keyboard information (e.g., an identity's typing patterns, keystroke data, or language usage)

mouse pattern (e.g., temporal and spatial patterns associated with an identity's movement of a mouse)

average typing speed (e.g., an identity's average words per minute or keystrokes per minute)

browser type (e.g., an identity's preferred internet browser)

network location (e.g., an IP address associated with one or more of an identity's computing devices)

geographic location (e.g., an identity's GPS location or coordinates)

device time zone (e.g., the time zone of an identity based on the location of one or more devices associated with the identity)

activity time (e.g., the duration of an identity's session while authenticated to a resource or the duration of one or more predefined activities, such as the duration of active Internet browsing or time spent with a document open)

top applications (e.g., the applications most often opened by the identity)

startup sequence (e.g., a sequence of applications being executed or accessed by an identity)

Data stored of machine and/or human response to challenges may include, for example:

network delay response (e.g. the amount of time a network may lag when accessing one or more resources)

application delay response (e.g., the amount of time an application may require to process and/or execute a command)

error message response (e.g., an identity's actions in response to an error message)

email arrival response (e.g., whether an entity stores, open, responds to, etc. an email upon receipt, or the average amount of time before a received email is read)

open ports response command response shutdown response restart response

Request data may include, for example:

login request data (e.g., how many times an identity attempted to access a system, whether the log-in attempt was successful, the device from which the request was made, etc.)

open request connection request service request voice request application request The data structure stored by blockchain network 506 may include any combination of the above described data or other data collected by one or more blockchain participants.

Blockchain network 506 may be hosted through the Internet, a local area network (LAN), a wireless local area network (WLAN), a wide area network (WAN), a cellular communication network, or any Internet Protocol (IP) based communication network and the like. In some embodiments, blockchain network 506 may be based on public cloud infrastructure, private cloud infrastructure, hybrid public/private cloud infrastructure, or no cloud infrastructure. In such differing embodiments, identity 502, secure resource 504, and server 510 may each be in the same, or in different, networks or network segments.

Identity authentication entries 508 are stored records associated with an identity that contain, or allow one to compute, a credibility score associated with that identity. Credibility scores refer to data indicating the amount of credibility an identity has accrued or earned, as discussed further below. Identity authentication entries 508 (e.g., unique parameters entered at steps 408, 410, 416, 418), may be stored in blockchain network 506 (e.g., in one or more distributed ledgers belonging to blockchain network 506). In some embodiments, each operation an identity (e.g., identity 502) makes on a device or in a network affects their credibility score. As discussed further below, system operators may configure the level of credibility, and the number of blockchain entities that must corroborate that credibility, before identity 502 is authenticated and able to access secure resource 504.

Numerous different types of data may be stored in the shared ledger in blockchain network 506. In some embodiments, these data are reported to blockchain network 506 in a secure way. For example, the applications or servers providing such data may be pre-authenticated to blockchain network 506.

As an example, in a social media environment, the ledger maintained in blockchain network 506 may store data regarding credibility-building actions of identities, including:

Time of sign-in and sign-out

Media posted (e.g., text, photos, videos, etc.)

Media consumed (e.g., text, photos, videos, web pages, etc.)

Updates to user profile including relationship history;

Updates to unique identification parameters to be entered that identify users of interest;

Updates to social media preferences.

In some embodiments, a determination is made of what information to store in the shared ledger, what information (if any) to store remotely, and what information (if any) to delete. Due to storage constraints, for example, it may be desirable to limit the amount of storage required in the common ledger. One technique, for example, may be to store only the most recent (e.g., last 100 days, most recent 100 credibility-building actions, etc.) data. Another technique may be to generate data descriptive of credibility-building actions and store that data rather than the actual credibility-building actions themselves. For example, descriptive data may include averages of credibility-building actions, sum totals of credibility-building actions, sum totals of credibility-building actions over predefined time periods, etc. Similarly, a determination may be made to store credibility-building action data in a storage resource remote from the ledger if storage space becomes a constraint. In such embodiments, for example, server 510 or blockchain network 506 may determine what data to store locally in the ledger and what data to store remotely at the storage resource. Using such techniques, the most recent data, or the most probative data for computing a credibility score, may be stored locally on the ledger and older or less probative data may be stored remotely, e.g., in a cloud-based storage system or external database. In some embodiments, data stored remotely may be accessible for business analytics.

Server 510 may include software (e.g., a standalone application, an integrated agent, etc.), that communicates with identity 502 and a blockchain-based or other distributed network (e.g., blockchain network 506). In some embodiments, server 510 may be device 300. In some embodiments, the software of server 510 is installed on devices (e.g., a machine running identity 502) or resources connected to blockchain network 506. Server 510 may be part of a service stored on the computing devices participating in blockchain network 506. In some embodiments, software on server 510 executes transparently to identity 502 or an operating system of identity 502. As discussed further below, server 510 may be configured to receive requests from identity 502 for access to secure resource 504. In such embodiments, the requests may be addressed to server 510 or, alternatively, server 510 may be configured to intercept such requests (e.g., intercept them from an application running on the same machine as identity 502, or from an operating system of the machine). Further, server 510 can either automatically or manually receive requests from identity 502 for access to secure resource 504. For example, if an application is seeking to access secure resource 504, the process may be automatic, whereas if a user is seeking to access secure resource 504, the request may be manually sent by the user.

In some embodiments, software from server 510 is installed on multiple entities in blockchain network 506. For example, if an enterprise has a blockchain network 506 that it is operating, each participating entity in the network may have a server 510. Further, as discussed below, in some embodiments, multiple different enterprises or organizations may seek to secure share a single blockchain network 506, such that a sufficient number of entities are participating and able to develop a consensus about authentication decisions. Regardless of the number of enterprises or organizations, server 510 may have access to a ledger, an identity contract 108, or both. For example, the ledger and identity contract 108 may be stored on the same device as server or stored separately in blockchain network 506.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed:

1. A system for establishing personal connections through secure verification of users, comprising:
   one or more memory devices storing instructions; and
   one or more processors configured to execute the instructions to perform operations comprising:
      authenticating a first user associated with a first set of identification parameters;
      authenticating a second user associated with a second set of identification parameters;
      receiving input from the first user comprising a subset of the second set of identification parameters;
      receiving input from the second user comprising a subset of the first set of identification parameters;
      comparing the received inputs from the first and second users; and
      determining a match based on the comparison of said inputs; wherein if the compared inputs meet a defined threshold determining that a match has been made:
         notifying the first user of the subset of the second set of identification parameters, and
         notifying the second user of the subset of the first set of identification parameters.

2. The system of claim 1 wherein:
the threshold is set based on parameters of previous involvement, the parameters of previous involvement comprising a duration of previous involvement, a level of seriousness of previous involvement, and reasons for termination of previous involvement.

3. The system of claim 2 wherein:
the threshold comprises a preset number of the identification parameters based on user preferences.

4. The system of claim 1 wherein:
the number of the identification parameters required increases with a level of seriousness of previous involvement.

5. The system of claim 1 wherein:
the first set of identification parameters comprises secure personal information, the secure personal information comprising social security number, city of birth, employment information, multi-factor authentication credentials, date of birth, nicknames, anniversaries, and maiden names; and
the second set of identification parameters comprises secure personal information, the secure personal information comprising social security number, city of birth, employment information, multi-factor authentication credentials, date of birth, nicknames, anniversaries, and maiden names.

6. The system of claim 1 wherein:
the subset of the first set of identification parameters comprises the relationship-specific criteria, the first relationship-specific criteria comprising date of birth, nicknames, anniversaries, and maiden names; and
the subset of the second set of identification parameters comprises second relationship-specific criteria, the second relationship-specific criteria comprising date of birth, nicknames, anniversaries, and maiden names.

7. The system of claim 6 wherein:
the first and second relationship-specific criteria facilitate the first user and the second user to match based on the comparison of the inputs.

8. The system of claim 1 wherein:
authenticating the first user further comprises authenticating an identity of the first user via a blockchain network; and
authenticating the second user further comprises authenticating an identity of the second user via a blockchain network.

9. The system of claim 1 wherein:
notifying the first user and the second user occurs when a match has been made from both the first user and the second user.

10. The system of claim 9 wherein:
notifying the first and second user is completed at a later time to preserve knowledge of which user first demonstrated interest.

11. A computer implemented method for establishing personal connections through blinded secure verification of non-random interested parties, comprising:
   authenticating a first user associated with a first set of identification parameters;
   authenticating a second user associated with a second set of identification parameters;
   receiving input from the first user comprising a subset of the second set of identification parameters;
   receiving input from the second user comprising a subset of the first set of identification parameters;
   comparing the received inputs from the first and second users; and
      determining a match based on the comparison of said inputs; wherein if the compared inputs meet a defined threshold determining that a match has been made:
      notifying the first user of the subset of the second set of identification parameters, and
      notifying the second user of the subset of the first set of identification parameters.

12. The method of claim 11 wherein:
the threshold is set based on parameters of previous involvement, the parameters of previous involvement comprising a duration of previous involvement, a level of seriousness of previous involvement, and reasons for termination of previous involvement.

13. The method of claim 12 wherein:
the threshold comprises a preset number of the identification parameters based on user preferences.

14. The method of claim 11 wherein:
the number of the identification parameters required increases with a level of seriousness of previous involvement.

15. The method of claim 11 wherein:
the first set of identification parameters comprises secure personal information, the secure personal information comprising social security number, city of birth, employment information, multi-factor authentication credentials, date of birth, nicknames, anniversaries, and maiden names; and
the second set of identification parameters comprises secure personal information, the secure personal information comprising social security number, city of birth, employment information, multi-factor authentication credentials, date of birth, nicknames, anniversaries, and maiden names.

16. The method of claim 11 wherein:
the subset of the first set of identification parameters comprises first relationship-specific criteria, the first relationship-specific criteria comprising date of birth, nicknames, anniversaries, and maiden names; and
the subset of the second set of identification parameters comprises second relationship-specific criteria, the second relationship-specific criteria comprising date of birth, nicknames, anniversaries, and maiden names.

17. The method of claim 16 wherein:
the first and second relationship-specific criteria facilitate the first user and the second user to match based on the comparison of the inputs.

18. The method of claim 11 wherein:
authenticating the first user further comprises authenticating an identity of the first user via a blockchain network; and
authenticating the second user further comprises authenticating an identity of the second user via a blockchain network.

19. The method of claim 11 wherein:
notifying the first user and the second user occurs when a match has been made from both the first user and the second user.

20. A non-transitory computer readable medium storing instructions which, when executed, cause at least one processor to perform operations comprising:
authenticating a first user associated with a first set of identification parameters;
authenticating a second user associated with a second set of identification parameters;
receiving input from the first user comprising a subset of the second set of identification parameters;
receiving input from the second user comprising a subset of the first set of identification parameters;
comparing the received inputs from the first and second users; and
determining a match based on the comparison of said inputs; wherein if the compared inputs meet a defined threshold determining that a match has been made:
notifying the first user of the subset of the second set of identification parameters, and
notifying the second user of the subset of the first set of identification parameters.

* * * * *

UNITED STATES PATENT AND TRADEMARK OFFICE
CERTIFICATE OF CORRECTION

| | |
|---|---|
| PATENT NO. | : 11,144,620 B2 |
| APPLICATION NO. | : 16/452958 |
| DATED | : October 12, 2021 |
| INVENTOR(S) | : Soudabeh Larsen et al. |

It is certified that error appears in the above-identified patent and that said Letters Patent is hereby corrected as shown below:

In the Claims

Claim 6, Column 18, Line 12, "comprises the relationship-specific criteria" should read --comprises the first relationship-specific criteria--.

Signed and Sealed this
Seventeenth Day of September, 2024

*Katherine Kelly Vidal*

Katherine Kelly Vidal
*Director of the United States Patent and Trademark Office*